United States Patent [19]

Curchod

[11] Patent Number: 4,574,490

[45] Date of Patent: Mar. 11, 1986

[54] WHEEL ALIGNMENT SYSTEM WITH BALL JOINT WEAR MONITOR AND METHOD

[75] Inventor: Donald B. Curchod, Menlo Park, Calif.

[73] Assignee: Dynabal Corporation, Palo Alto, Calif.

[21] Appl. No.: 699,357

[22] Filed: Feb. 7, 1985

Related U.S. Application Data

[63] Continuation-in-part of Ser. No. 600,257, Apr. 13, 1984, abandoned.

[51] Int. Cl.[4] .............................................. G01B 7/315
[52] U.S. Cl. ............................. 33/203.18; 33/203.19; 33/288
[58] Field of Search ................. 33/203.18, 203, 203.15, 33/203.16, 203.19, 180 AT, 288, 203.14, 203.19

[56] References Cited

U.S. PATENT DOCUMENTS

| | | | |
|---|---|---|---|
| 4,097,157 | 6/1978 | Lill | 33/288 |
| 4,138,825 | 2/1979 | Pelta | 33/203.18 |
| 4,192,074 | 3/1980 | Chang | 33/203.18 |
| 4,319,838 | 3/1982 | Grossman et al. | 33/288 |
| 4,381,548 | 4/1983 | Grossman et al. | 33/288 |

*Primary Examiner*—Willis Little
*Attorney, Agent, or Firm*—Flehr, Hohbach, Test, Albritton & Herbert

[57] ABSTRACT

A wheel alignment and ball joint wear monitoring system employs a diagrammatic pictorial video display of the chassis of the vehicle being aligned and pictorial diagrams of alignment parameters associated with each of the wheels of the chassis. The region of each wheel when separately enlarged carries a chassis diagram indicating which wheel portion of the diagram has been enlarged. The system permits successive measurements of camber and of toe to be used to determine ball joint wear in the vertical and horizontal planes.

18 Claims, 13 Drawing Figures

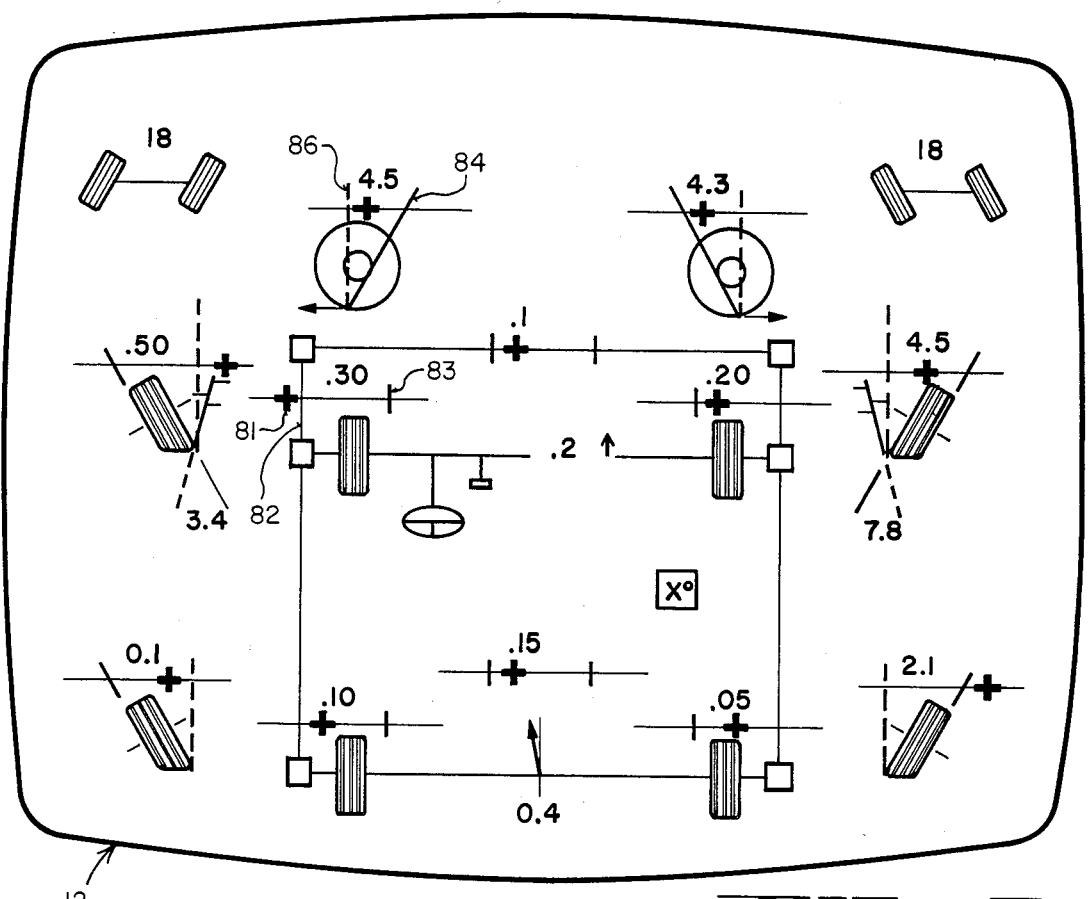
FIG_2
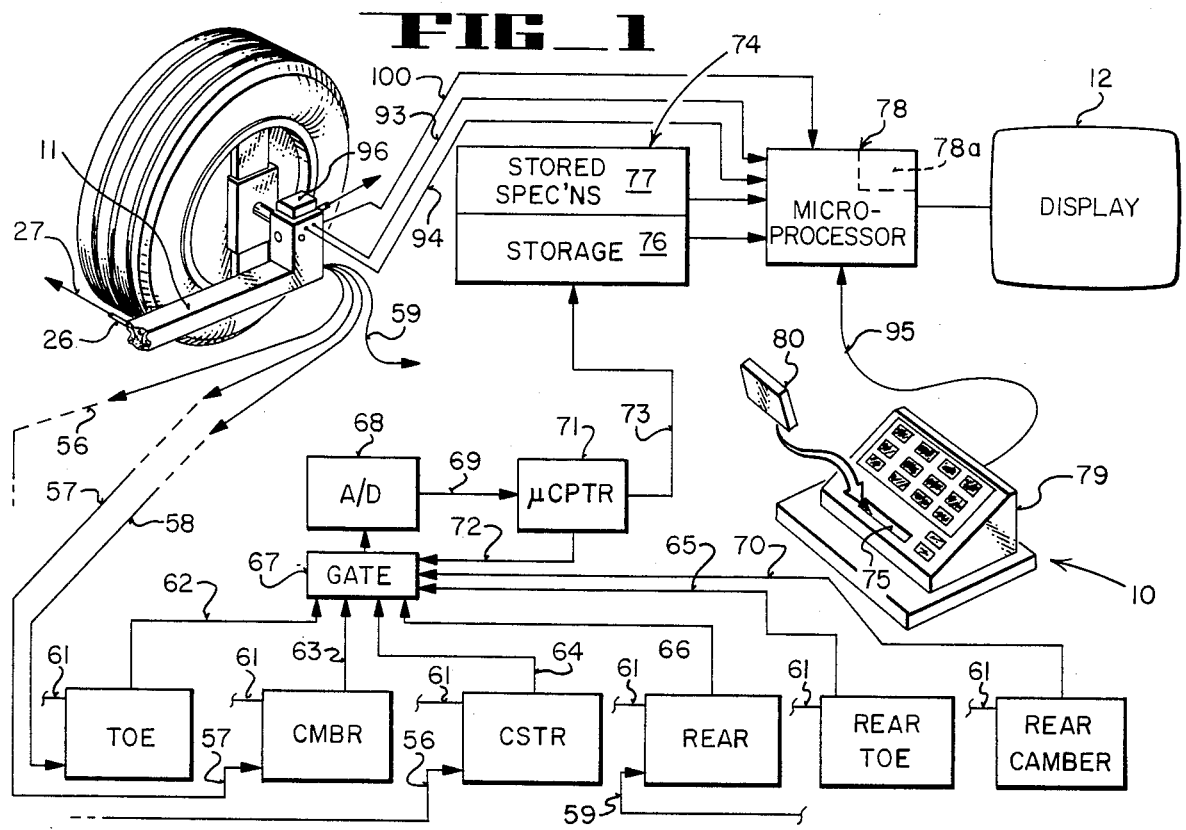
FIG_1

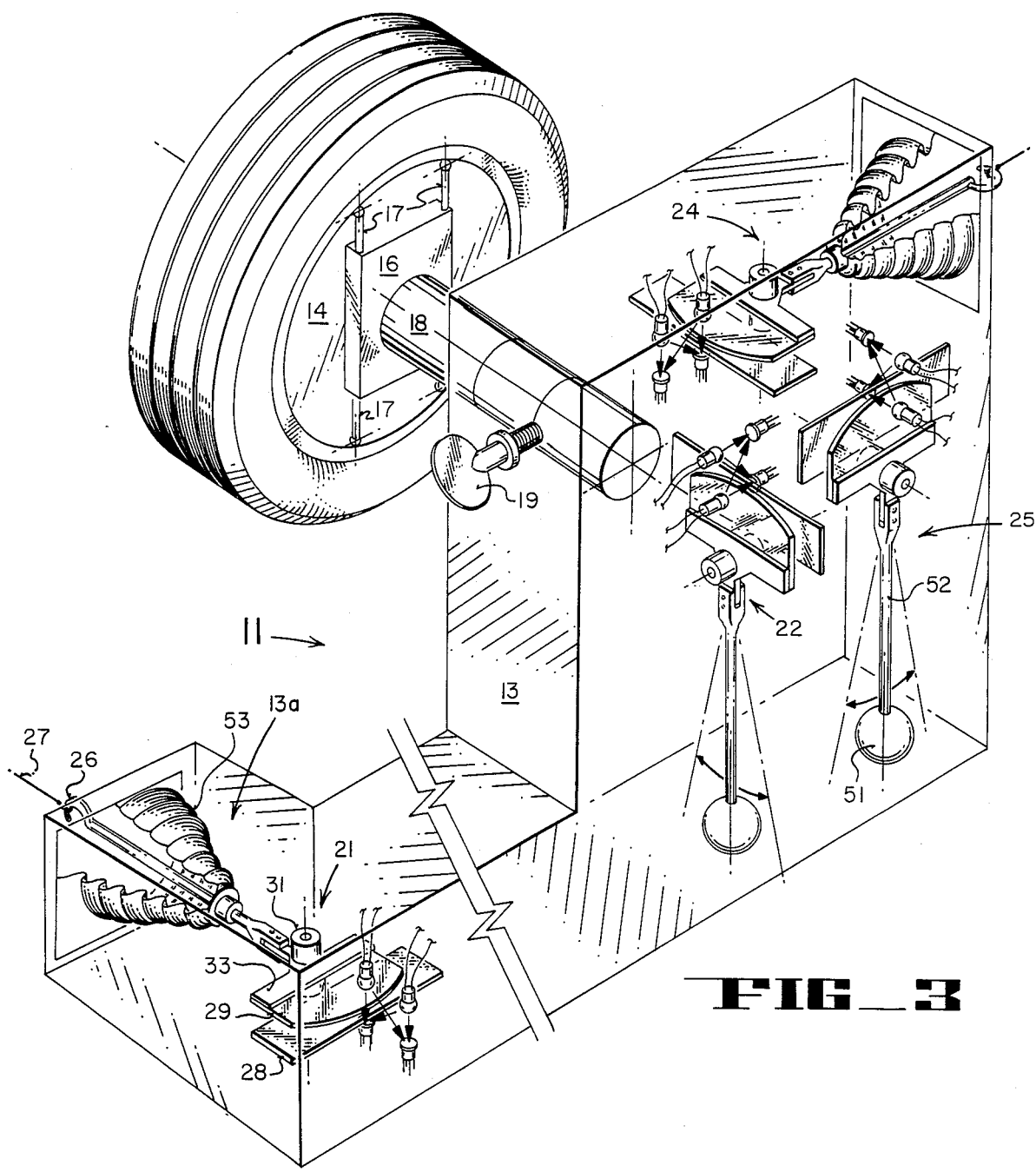
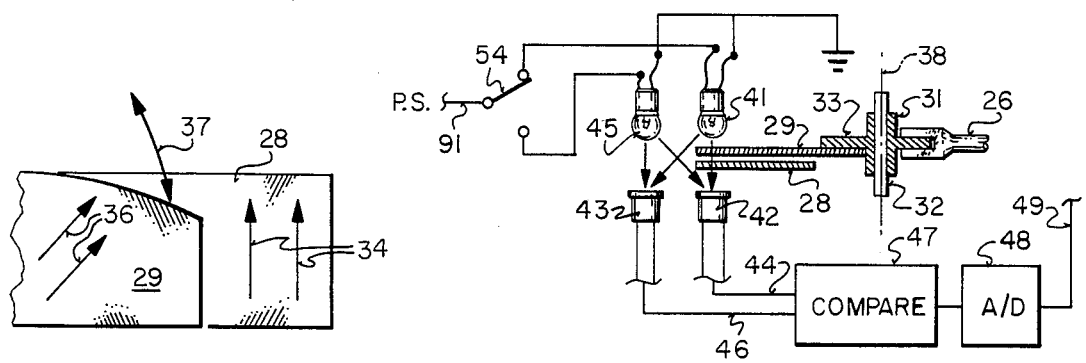
FIG_3
FIG_9  FIG_4

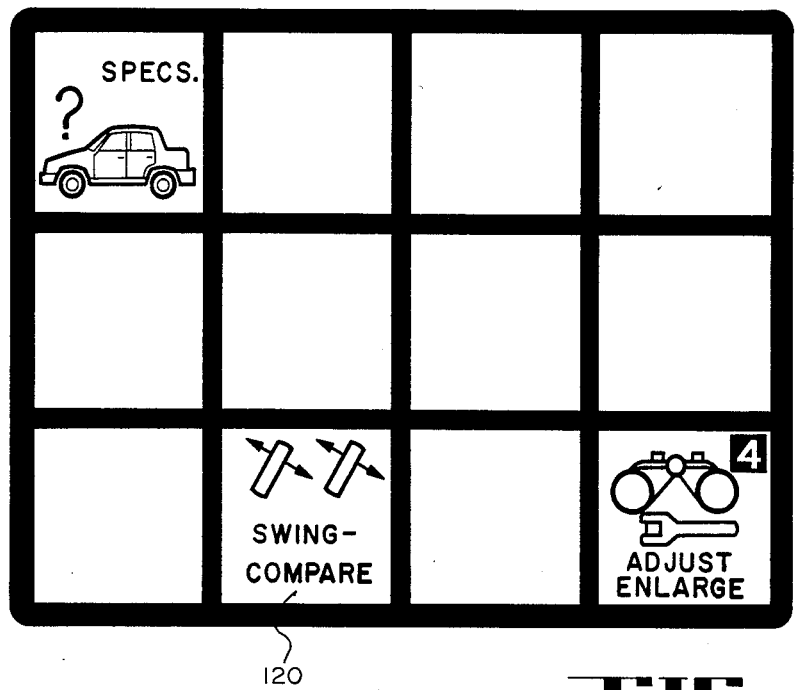
FIG_5
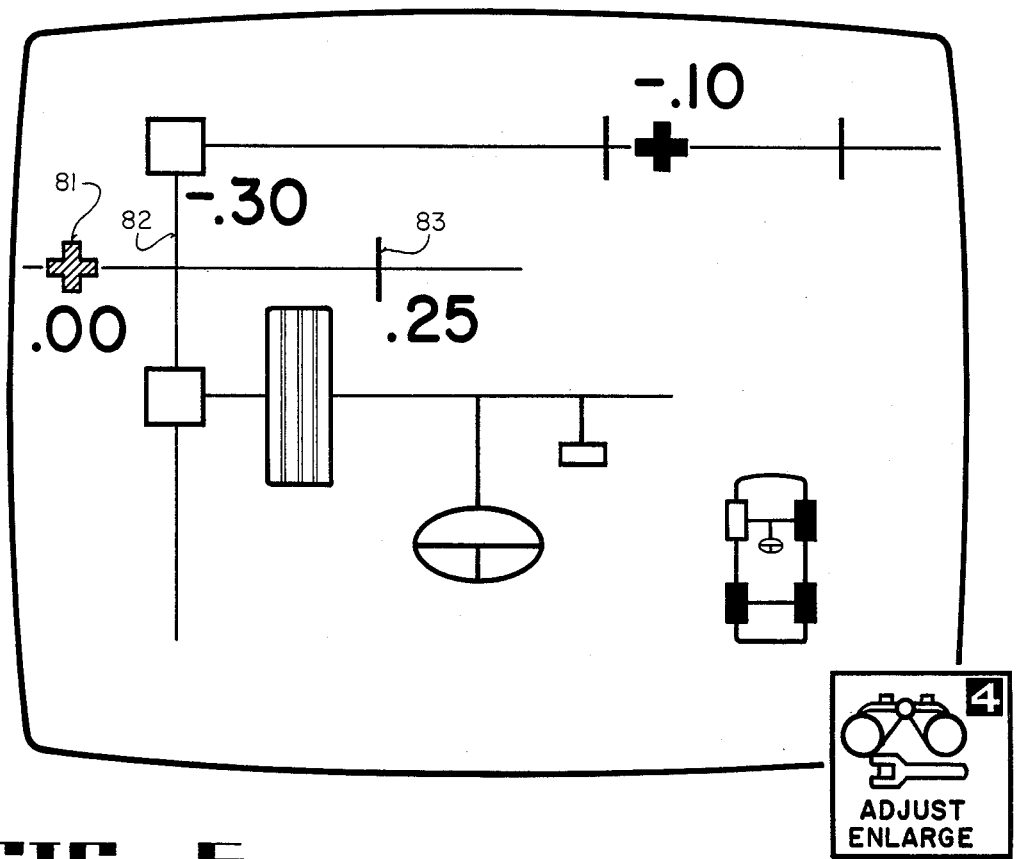
FIG_6

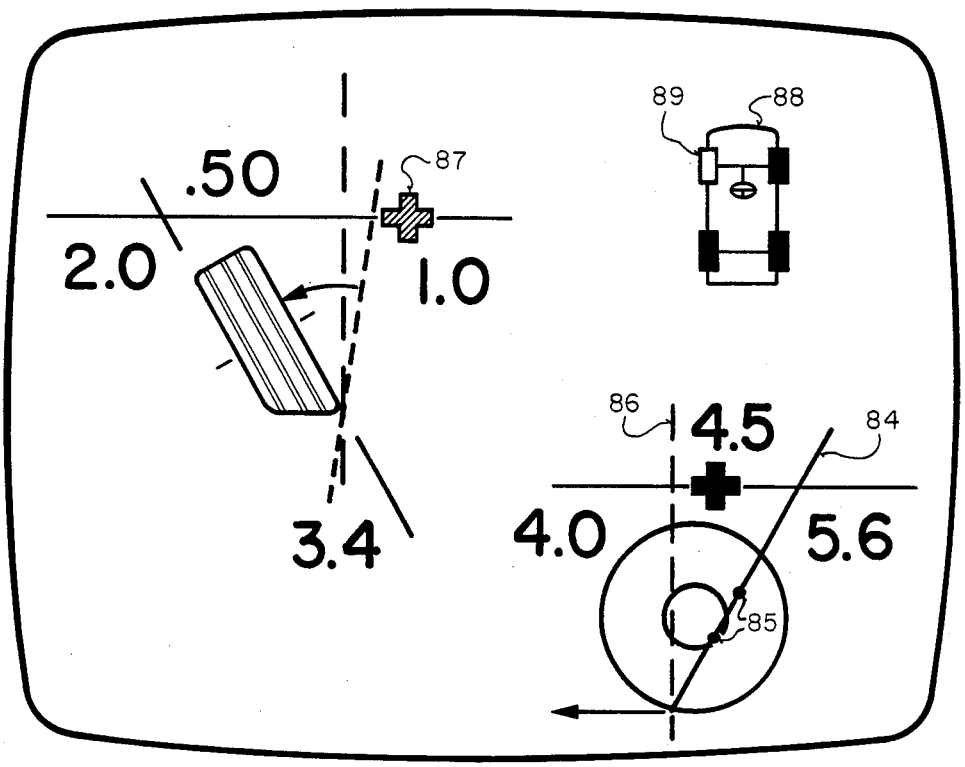
FIG_7
FIG_8
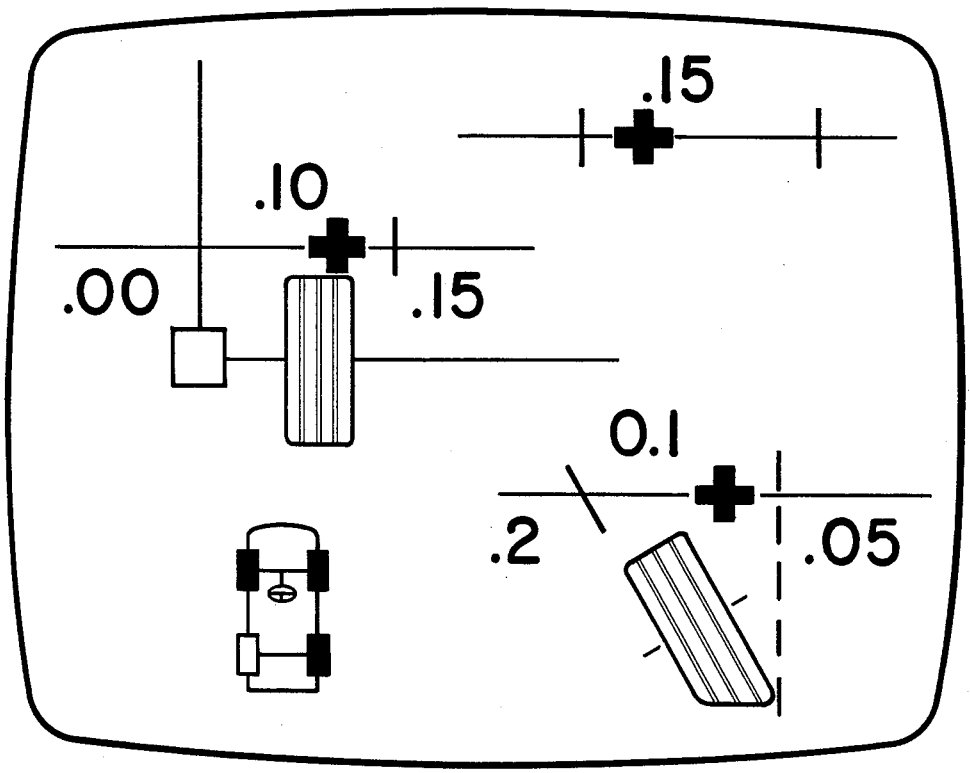

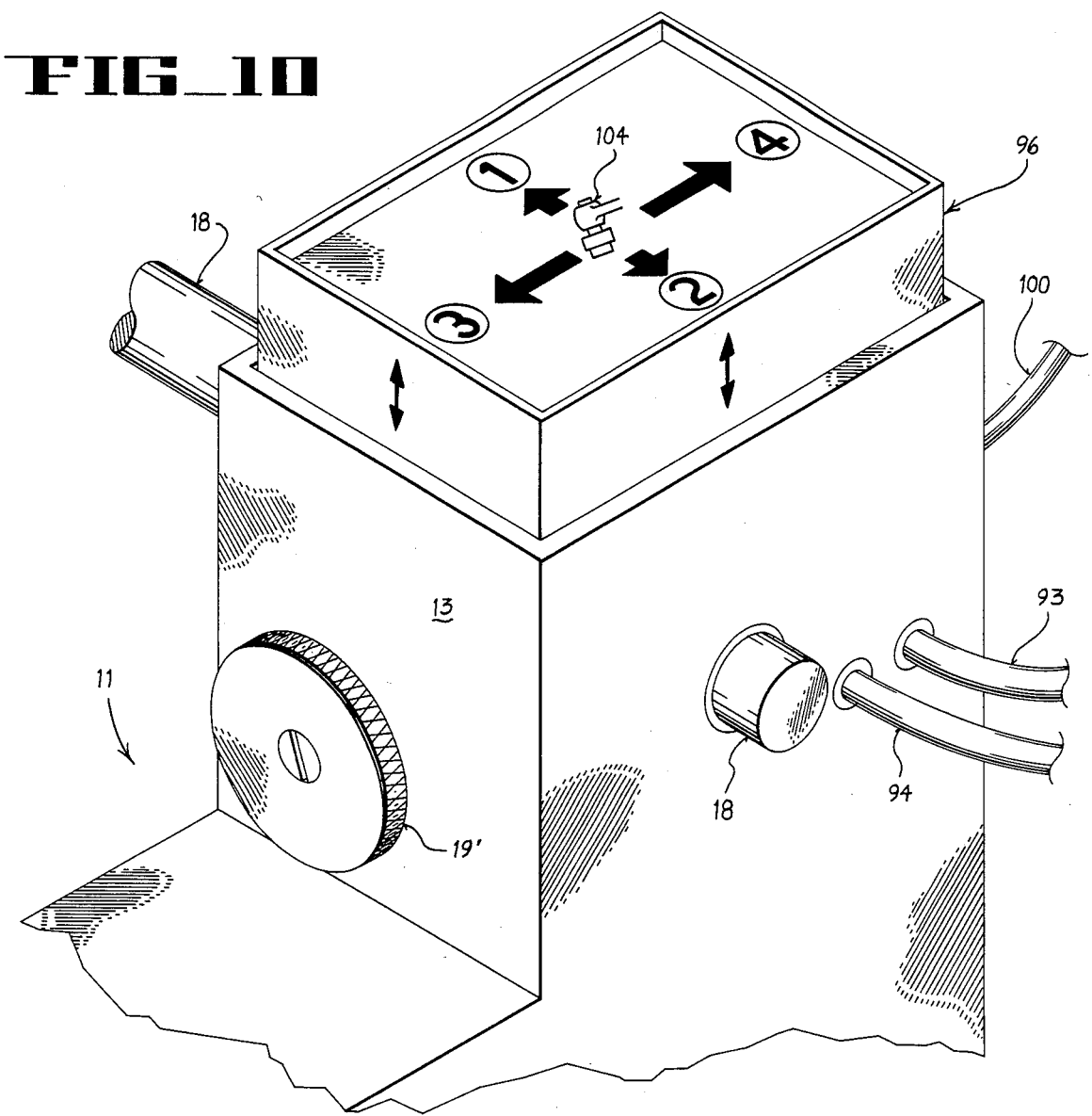
FIG_10
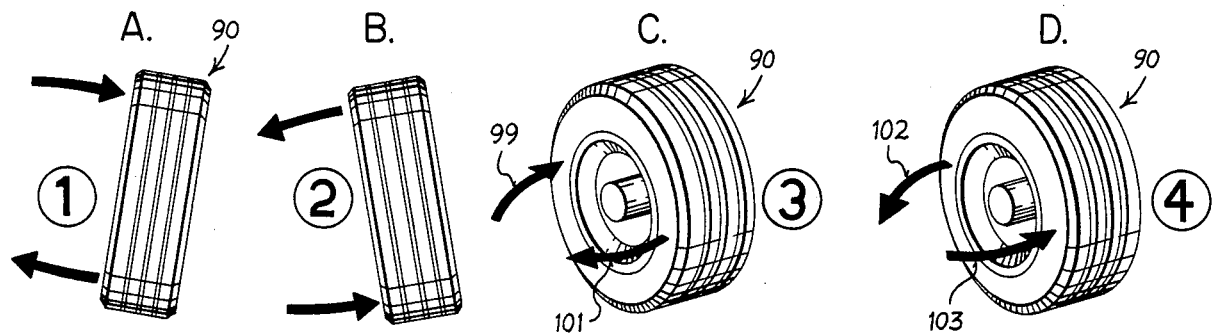
FIG_12

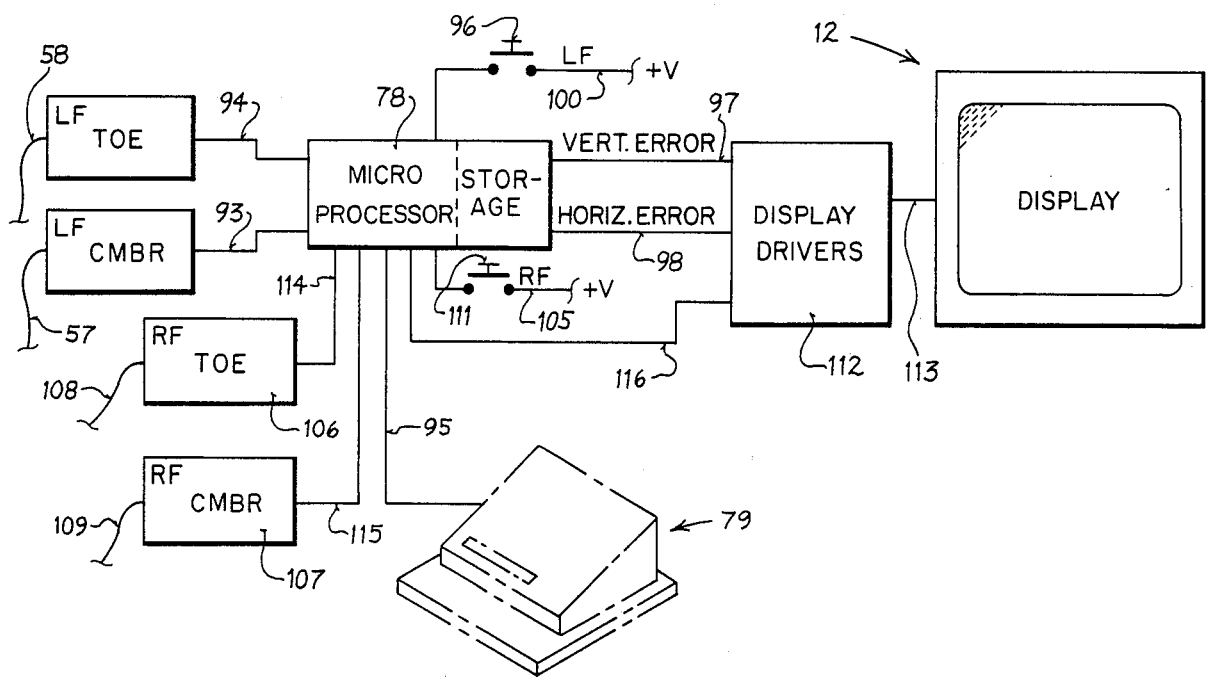
FIG_13
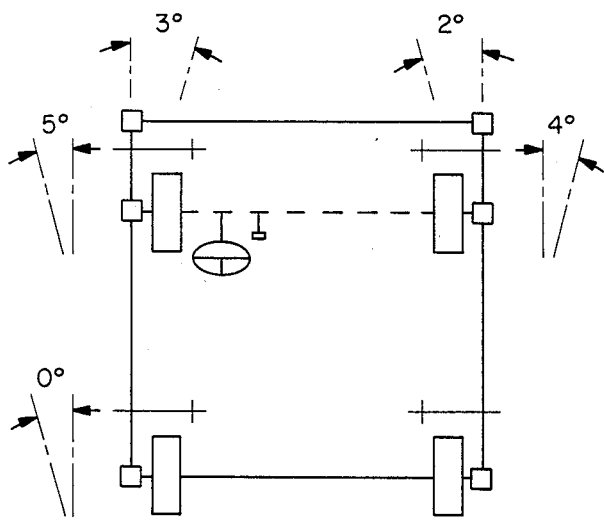
FIG_11

WHEEL ALIGNMENT SYSTEM WITH BALL JOINT WEAR MONITOR AND METHOD

This application is a continuation-in-part application of copending application Ser. No. 600,257 filed Apr. 13, 1984, in the name of Donald B. Curchod, now abandoned.

This invention pertains to a wheel alignment system including means and a method for detecting and monitoring ball joint wear.

More particularly this invention pertains to a wheel alignment system and method in which a pictorial representation of the entire vehicle chassis is displayed for a given vehicle and where the status of alignment parameters with respect to upper and lower limits of proper adjustment for the parameter are diagrammatically shown on a pictorial display representative of the parameter.

In the past, wheel alignment systems have employed means for measuring camber, caster and toe. Having once determined the camber, caster and toe for a given wheel, reference can be made to a book of specifications to determine the proper specifications for the particular vehicle being aligned. Then a mechanic can make appropriate changes in the condition of the wheel so as to bring it within the specifications indicated.

A similar system, as shown in U.S. Pat. No. 4,381,548, computes and displays the amount of correction needed to bring a parameter within proper adjustment. Thus, a display of differences is simply shown, leaving it to the mechanic to insure that adjustments are properly made.

The pictorial displays herein accompanied by a showing of the status of a given parameter in conjunction with the upper and lower limit of its specification leave little to chance and make it easier for adjustments to be made without error.

In the present instance an alignment system is provided wherein specifications of virtually all present day motor vehicles have been stored in a manner whereby the specifications for a given vehicle can be retrieved and displayed on a pictorial representation of the chassis of the vehicle. In addition, a marker pictorially indicates the status of a given alignment parameter with respect to its upper and lower specification limits. For those parameters which are not within the limits defined by the vehicle's specifications, the marker will flash off and on to call the operator's attention to the fact that a particular parameter (camber, caster, toe, etc.) is not within its specified range. Further, as repairs are made, the marker can be observed to move from beyond the limits to a position within the proper alignment limits.

It has been observed that the existence of badly worn ball joints can frustrate the accurate alignment of the vehicle wheels. Accordingly, the system disclosed herein permits the mechanic to quickly detect this condition and to measure the degree of ball joint wear before attempting to align the wheels. Thus, the ball joints can be corrected before aligning the wheels.

As disclosed herein a system is provided for reducing the possibility of error in aligning the wheels of a vehicle while at the same time enhancing the speed with which the alignment process can be completed.

In general, the wheel alignment system includes means for displaying on a screen a diagrammatic pictorial representation of the vehicle chassis including all four wheels and a plurality of pictorial diagrams shown in immediate association with each wheel to respectively display pictorially the status of a corresponding plurality of alignment parameters for each wheel. The last named means includes an indicator displayed in association with each pictorial diagram for a given wheel. Each of the indicators is movable between and beyond upper and lower limits indicated on the screen to show the status of a wheel alignment parameter to be within proper limits or not, the limits being defined to correspond to the specific vehicle alignment specifications. Means for sensing the status of the wheel alignment parameters have been provided along with means for controlling the analog position of each of the markers with respect to the limits associated therewith in response to adjustments made to the wheel associated with the marker. In addition, the last named means displays digital values associated with the lower and upper limits of the parameter which is sensed as well as with respect to the status of such parameter.

In general, it is an object of the present invention to provide an improved wheel alignment system wherein the entire vehicle chassis is displayed together with pictorial representations of various wheel alignment parameters and markers associated therewith movable between and beyond the upper and lower limits indicated for a given vehicle.

It is another object of the invention to provide a wheel alignment system featuring an improved sensor arm assembly.

It is yet another object of the invention to provide a wheel alignment system having means for quickly detecting worn ball joints and for measuring the degree of wear.

A further object is to provide a method of detecting and/or measuring ball joint wear.

The foregoing and other objects of the invention will become more readily evident from the following detailed description of a preferred embodiment.

FIG. 1 shows a diagrammatic view of the alignment system according to the invention;

FIG. 2 shows the nature of the pictorial display associated with the system of FIG. 1;

FIG. 3 shows a diagrammatic perspective view of a sensor arm assembly as carried on the wheel, the arm assembly being substantially enlarged with respect to the wheel for purposes of clarity with the nearest panel being shown in phantom lines to disclose the interior;

FIG. 4 shows an elevation section view of a sensor according to the invention;

FIG. 5 shows a diagrammatic view of a keyboard controller with only two keys identified;

FIG. 6 shows an enlarged pictorial display of a portion of the display shown in FIG. 2 indicating the toe parameter for the left front wheel of a vehicle and total toe;

FIG. 7 shows an enlarged pictorial display of two additional alignment parameters pictorially displayed with respect to the left front wheel of the vehicle as shown in FIG. 2;

FIG. 8 shows an enlarged pictorial display of two additional alignment parameters pictorially displayed with respect to the left rear wheel of the vehicle shown in FIG. 2;

FIG. 9 shows an enlarged diagram representing a plan view of portions of the overlying panels of polarized material employed in the sensor assemblies.

FIG. 10 shows an enlarged perspective view of the rear portion of a sensor arm assembly according to another aspect of the invention;

FIG. 11 shows a diagram of a type used on the video display to indicate ball joint wear;

FIG. 12 shows a diagrammatic view of a wheel and tire being acted upon in four stages of a ball joint wear measurement method according to the invention;

FIG. 13 shows a schematic diagram of a system for detecting or measuring ball joint wear.

A system 10 commencing with a sensor arm assembly 11 provides, as described further below, a video pictorial output display 12 (FIG. 2) showing the status of various wheel alignment parameters, e.g. camber, caster, toe, etc., as well as enlargements thereof as shown in FIGS. 6, 7 and 8. Sensor arm assembly 11 is best shown in FIGS. 3, 4 and 9 as now to be described. Sensor assembly 11 includes a support housing 13 having a portion 13a which extends beyond the periphery of a wheel associated with the assembly so that an elastic cable 27 can be extended from one side of the vehicle to the other in front of the front wheels or behind the rear wheels. Housing 13 is carried by wheel 14 in a manner permitting the wheel to rotate independently of housing 13. Thus, a mounting bracket 16 characterized by extensible arms 17 serves to engage the rim of wheel 14 to dispose mounting bracket 16 in substantially spaced parallel relation to wheel 14. Mounting bracket 16 carries a protruding support post 18 for carrying housing 13 thereon. Post 18 is free to rotate with respect to housing 13 unless coupled thereto by means of the thumb screw 19.

Within housing 13 means are provided for sensing the angle of toe, camber, caster correction, and the angle of a cable extending rearwardly and coupled to the rear wheel. Accordingly, a sensor assembly 21 serves to detect changes in the angle of toe. A camber sensor 22, caster correction sensor 23 and rear cable sensor 24 are generally constructed as now to be described with respect to toe sensor 21 and therefore only one such sensor has been described in detail.

Toe sensor 21 includes an elongate hook element 26 adapted to be coupled to cable 27 extending across the front of the vehicle to a similar toe sensor on the other side. Fixed and movable transparent panels 28, 29 disposed in closely spaced superposed relation are respectively optically polarized, preferably at 45° to each other to partially inhibit passage of light therethrough when disposed at a zero angle relation, i.e., as shown in FIG. 9. Thus, relative rotational movement between panels 28, 29 causes a reduction in transmissivity of light when rotated in one direction and an increase when rotated in an opposite direction. Thus, panel 29 is mounted by means of a support collar 31 secured to a pivot pin 32. Collar 31 is formed with a transversely extending flat flange-like portion 33 secured to panel 29. The fixed panel 28 is suitably supported by means (not shown) but as will be readily evident to one skilled in the art.

As shown in FIG. 9, arrows 34, 36 indicate the direction of polarization of each of panels 28, 29, respectively.

Element 26 serves to rotate panel 29 with respect to panel 28. When element 26 extends normal to the leading edge of the fixed panel 28, the degree of transmissivity of the two panels is deemed to represent a zero angle relation between the panels. When element 26 moves panel 29 counter-clockwise (as shown in FIG. 9), the direction of polarization for both panels tends to become closer to the same direction. As is known, this alignment of polarized lenses will increase the transmissivity through the two panels to the other side. Rotation of panel 29 clockwise, however, increases the angle between the directions 34, 36 of polarization so as to decrease the transmissivity of the combined panels.

As shown in FIG. 4, the light source 41 transmits light directly downwardly through both panels 29, 28 and onto a photosensor 42 disposed to detect the light. Another photosensor 43 receives light transmitted directly to it from light source 41 uninhibited by panels 28, 29 so as to establish a standard for comparison. Accordingly, the output of photosensor 43 will represent a basic standard against which the change in transmissivity via the two panels will be measured. In the event that light source 41 becomes weakened and provides less light, the relationship between the output on lines 44, 46 will remain the same. Normally, the difference between the output on line 44 as compared to the output on line 46 can be assumed to be derived from the presence and relative positioning of panels 28, 29 in the transmission path between light source 41 and sensor 42. However, inasmuch as it is possible that one or the other of the two sensors 42, 43 may be subject to drift which would provide a differential output, a second light source 45 shining directly onto both sensors has been provided together with means for selectively operating light source 45 independently of light source 41. Thus, a switch armature 54 or other suitable switching means has been provided to connect a power source from lead 91 selectively to the input side of light source 41 or 45. The output side of each light source is coupled to ground.

Accordingly, use of the second light source can be employed to calibrate the two sensors 42, 43.

The outputs on lines 44, 46 are supplied to a comparing circuit 47 whereby an analog signal will be derived representative of the difference between light passing directly to sensing means and light passing through the panels. An analog-to-digital converter 48 converts the output from comparator 47 to a digital output on line 49.

From the foregoing it will be readily evident that positive and negative values will be detected depending upon whether the light increases or decreases.

In order to operate the camber and caster sensing devices 22, 23, a steel ball 51 is carried at the outer end of an elongate element 52 coupled to an associated movable polarized panel as described above.

With respect to toe sensor 21 and rear angle sensor 24, both of which require that the elongate element extend out of housing 13, a bellows-type seal 53 of readily flexible impervious material forms a closure for the openings in housing 13.

When aligning the wheels of a vehicle, a sensor arm assembly 11 will be secured to each of the four wheels to provide appropriate input data to the system. Accordingly, as shown in FIG. 1, one of the four wheels and four sensor arm assemblies 11 is shown supplying inputs for toe, camber, caster and the rear angle via leads 56, 57, 58 and 59. Inputs from the other three wheels have been diagrammatically represented by the short input lines 61 associated with each of the input boxes identified as toe, camber, caster, rear wheel angle, rear wheel toe, and rear camber.

Inputs representative of the angles of toe, camber, caster and rear angle as supplied by the sensor arm assemblies 11 from the front wheels are fed by output leads 62, 63, 64, 66 to a gate 67, while inputs representative of rear wheel toe and camber are supplied via leads 65, 70. The output of gate 67 leads to an analog-to-digital converter 68 whereby a digital output appears on line 69 to supply information to a microcomputer 71.

Microcomputer 71 is suitably programmed to control the sequence of operation of gate 67 via a control line 72 whereby information can be sequentially gated, for example, from the sources of toe, camber, caster, rear angle, rear toe and rear camber. Accordingly, the output from converter 68 is then supplied via lead 73 to a storage unit 74 having a first portion 76 for storing the information derived from sensing the wheel alignment parameters of the wheels. Storage unit 74 includes a second portion 77 containing the stored alignment specifications for alignment of the wheels of some 1400 automobiles and trucks, i.e., most vehicles generally in existence.

A microprocessor 78 under control of a keyboard assembly 79 (described further below) serves to supply video display 12 with a listing of the vehicle types from the stored specifications portion 77 of unit 74. By means of a suitable known cursor, the operator can pick a particular vehicle which is being aligned and in so doing the specifications for that particular vehicle (along with a pictorial diagram of a vehicle chassis) will be transferred from storage portion 77 to provide display 12 in the manner shown in FIG. 2. In addition, microprocessor 78 supplies display 12 with the detected or sensed values stored in portion 76. Keyboard assembly 79 includes a slot 75 to receive a cartridge 80 of a type containing an erasable, programmable, read only memory (EPROM). The EPROM contains the specifications for vehicles whereby under control of microprocessor 78 they can be entered into storage 77.

Keyboard assembly 79 includes a number of keys, three of which are shown in FIG. 5 as illustrative. For example, by striking the specifications key, the microprocessor 78 is instructed to transfer a list of all makes of automobiles for which specifications have been stored in portion 77 to the display 12. Another key (not identified) when depressed serves to transfer the information from storage portion 76 to display 12. Once the pictorial diagram representative of a given vehicle chassis is shown on the screen of video display 12 and the lower and upper limits indicated, the addition of the sensed information from storage 76 to the various alignment parameters provides an immediate pictorial indication of those parameters which need to be adjusted. For example, as shown in FIG. 2, the three parameters which are out of alignment to the extent that they are beyond the limits of proper alignment for the particular vehicle whose alignment parameter limits have been displayed on the screen include the left front wheel toe, the left front camber, and the right rear wheel camber.

For example, in the overall diagram representative of the entire vehicle chassis, the left front wheel shows a left-hand limit 82 and a right-hand limit 83 for toe, while an indicator or marker 81 appears beyond the left-hand limit 82. Suitable comparing circuitry 78a in microprocessor 78 is provided for causing any marker or indicator to flash on and off at a rate sufficient to catch a person's eye whenever it is beyond the limits indicated. Thus, comparing circuitry 78a of microprocessor 78 receives the upper and lower specification limits for each alignment parameter from portion 77 as well as an input representative of the status of the parameter from portion 76 of storage unit 74. The status of the parameter can thereby be determined as being within the limits or beyond.

Depressing an additional control key on keyboard assembly 79, such as the "Adjust Enlarge" key of FIG. 5, causes microprocessor 78 to display an enlargement of pictorial diagrams associated with each wheel. Accordingly, referring to FIG. 6, such an enlargement of the left front wheel has been displayed.

The following convention has been used to determine positive and negative status of a given value.

When wheels are toed inwardly, the value given to the toe angle is positive but when the wheels toe outwardly, the angle is negative. With respect to camber, when the wheel leans outwardly from the top, the value is considered positive and when the top of the wheel leans inwardly, the value in considered negative. With respect to caster, the front fork of a bicycle has positive caster, whereas if the handlebars and front wheel are reversed so that the fork points rearwardly, the caster for the front wheel will be negative. Similarly, caster is determined to be positive or negative with respect to vehicle wheels. Thus in FIG. 2, the caster for the left front wheel is defined by a line 84 defining the steering axis inclination drawn through the knuckles of a kingpin or ball joints 85 associated with the left front wheel and a vertical line 86 extending upwardly and normal to the point of contact of the wheel to the ground.

In addition, the total toe is displayed on the overall diagram of the vehicle chassis as the sum of the right front toe and the left front toe. In the instance shown, the total toe is −0.10 and the left toe is beyond the lower limit. In correcting this condition, the mechanic touches the "adjust enlarge" key to bring up the (FIG. 6) enlarged view. As the mechanic corrects the left toe to bring it within the specifications for that wheel and that vehicle, the mechanic can observe on the screen of display 12 the rightward movement of the marker or indicator 81 until it is disposed well between the lower and upper limits 82, 83.

Similarly, as shown in FIG. 7, the limits of camber are indicated as 2.0 and 1.0. However, the indicator 87 lies to the right of the lower limit and a digital indication of the actual value of the true camber for that wheel under that circumstance is shown as 0.50.

In order to ensure identity of the particular wheel whenever the enlargements are employed, a diagrammatic chassis representation 88 is displayed with three of the four wheel positions dark and the fourth wheel position 89 light.

The convention employed in designating both the limits and the present condition or status of the alignment parameter being sensed has been to provide the digital value of the limits below a transverse line and the digital value of the alignment parameter (as it exists) above the line and disposed between the limits.

From the foregoing it will be readily evident that there has been provided a relatively simple wheel alignment system wherein the technician will be able to readily detect those wheel alignment parameters which are beyond their appropriate limits and to be able to employ a combined analog and digital pictorial display in association with each wheel as the physical correction to the wheel is made.

A method and means for measuring the degree of ball joint wear in both horizontal and vertical planes has been included in system 10 as now to be described with respect to FIGS. 1, 10-13. Briefly, the steering wheel of the vehicle is initially locked against rotation using known means. The vehicle is then jacked up clear of the ground. Sensor arm assemblies 11 are mounted to be carried by the steerable front wheels to supply camber and toe output signals therefrom to the microprocessor 78 or other computer having means for comparing input values representative of camber and toe to derive the difference between two successive camber or two successive toe values from the same wheel as the front wheels are manipulated as in FIG. 12.

Thus, it is intended that by twisting the plane of wheel 90 as shown (greatly exaggerated) in FIGS. 12A and 12B, two successive camber readings can be detected for comparison. Similarly, two successive toe readings can be detected for comparison by twisting the plane of the wheel laterally as in FIGS. 12C and 12D. The degree of difference between these pairs of readings for camber and toe provides an indication of the amount of ball joint wear in each of two planes, respectively vertical and horizontal. Preferably, microprocessor 78 is suitably programmed to convert this difference signal to an angle as shown on display 12 (FIG. 11).

A pair of leads 93, 94 provides camber and toe outputs from associated sensors of assembly 11 carried on the left front wheel, and leads 114, 115 from the right front wheel. An operating button 96 or key carried by the rear portion of assembly 11 moves between raised and lowered positions for preconditioning microprocessor 78 to store information with respect to toe and camber. Operating the button supplies control signals to microprocessor 78 via one of leads 100, 105 (for left or right front wheels).

Briefly, information is supplied to microprocessor 78 according to a predetermined sequence in known manner using button 96 to successively precondition microprocessor 78 whereby the incoming information can be identified. Thus, ball joint wear in the vertical plane can be detected by depressing button 96 and then twisting the plane of the wheel and tire assembly 90 clockwise as shown in FIG. 12A. After the plane of the wheel has been twisted to its maximum extent and held for a short period on the order of several seconds, the camber of that wheel will be entered into microprocessor 78. Subsequently, button 96 is depressed again and the plane of wheel 90 rotated in a reverse direction as shown in FIG. 12B. The wheel is held in that position for several seconds, again to permit entry of the new camber condition of the wheel into microprocessor 78. Accordingly, the values of camber for both conditions shown in FIGS. 12A and 12B are stored in microprocessor 78. By suitably programming microprocessor 78 these two values can be compared to determine the amount of vertical error. This vertical error will appear as a signal on output lead 97 to be supplied to an appropriate display driver 112 coupled to video display 12.

Similarly, in order to determine the ball joint wear in a horizontal plane two toe readings are obtained and stored for comparison in microprocessor 78 by first locking the steering wheel against rotation, and then depressing button 96 to enter information from the toe sensor in assembly 11 while attempting to turn the wheel 90 in a first "steering direction." Accordingly, as shown in FIG. 12C the arrows 99, 101 represent forces applied to the wheel when attempting to twist the plane of the wheel in a first "steering direction". In short, if the wheel were free to turn and if the wheel is a left front wheel, then the forces represented by the arrows 99, 101 indicate an attempt to steer the wheel to the right. These forces are maintained for several seconds sufficient to permit this toe condition to be read into microprocessor 78. Thereafter, button 96 is again depressed to permit the toe input to be entered when the plane of the wheel is twisted in an opposite direction as shown in FIG. 12D. Accordingly, arrows 102, 103 represent forces attempting to "steer" the wheel to the left.

In the interest of convenience to the mechanic or operator of this equipment a diagram 104 representative of a ball joint is shown on sensor arm assembly 11. The diagram 104 includes the sequence of numbers from 1 through 4 which represent the above-described sequence of movements applied to the wheel and tire assembly 90 as shown in FIG. 12.

A sensor assembly associated with the right front wheel of the vehicle but comparable to assembly 11, described above, supplies toe and camber inputs to microprocessor 78 via leads 108, 114 and 109, 115 in the manner described above upon depressing a button 111 (comparable to button 96).

Accordingly, for each steerable wheel, both a vertical error signal appearing on lead 97 and horizontal error signal appearing on lead 98 can be derived from sampling the successive conditions of camber and from sampling the successive conditions of toe. The amount of ball joint wear is pictorially shown by coupling the error signals from leads 97, 98 to display drivers 112 coupled to a video display 12 via lead 113.

Microprocessor 78 is suitably programmed to provide the video display indicating ball joint wear as shown in detail in FIG. 11.

A diagrammatic pictorial representation of the entire chassis of a vehicle as shown in FIG. 11 is displayed on the video monitor 12. Accordingly, by using the toe sensors, the amount of horizontal lost motion or error in the left front wheel is indicated in the present example as being three degrees. The amount of horizontal error in the right front wheel is indicated as being two degrees.

The vertical error derived from the camber sensors is shown to be five degrees for the left front wheel and four degrees for the right front wheel.

In order to quickly detect the existence of lateral lost motion, which may indicate ball joint wear in the horizontal plane, comparison of the toe inputs is made as the wheels are steered left and right, such as during a "caster swing". Thus, during this movement, if one wheel moves x° before the other wheel moves, then there is x° of lost motion in the horizontal plane whereby the mechanic will be alerted to check for ball joint wear.

Depressing the key 120 marked "Swing-Compare" of keyboard 79 causes microprocessor 78 to be coupled via lead 95 to keyboard 79 to cause microprocessor 78 to be suitably programmed to continuously monitor and compare the values of left and right toe via leads 94, 114 and to provide an output signal on lead 116 representative or indicative of change in the difference between the right front and left front toe inputs. The output signal representative of change in the difference between the toe inputs provides a measure of lost motion in the horizontal plane. Microprocessor 78 converts the change in difference to information representative of an angle supplied to display 12 via lead 116 and display drivers 112.

In addition to other components of the pictorial display of toe, camber, etc., a marker (such as a cross) moves in response to corrections in toe, cambers, etc. While this movement of the marker has been referred to as "analog", it is to be understood that it is not necessarily linear.

Accordingly, it will be readily evident that there has been provided an improved alignment system characterized by means for readily detecting and permitting correction of ball joint wear while information pertaining to that wear is pictorially displayed on a video display associated with the system.

I claim:

1. In a wheel alignment system for a vehicle of a type having a laterally spaced pair of steerable wheels and a laterally spaced pair of unsteerable wheels generally following the steerable wheels, said system including means for displaying on a screen a diagrammatic pictorial representation of the vehicle chassis including all four wheels and a plurality of pictorial diagrams shown in immediate association with each said wheel to respectively display pictorially the status of a corresponding plurality of alignment parameters for each wheel, the last named means displaying an indicator disposed in association with each pictorial diagram for a given wheel, each of said indicators being movable between and beyond upper and lower limits indicated on the screen to show diagrammatically the status of a wheel alignment parameter to be within proper limits or not, said limits being defined to correspond to the vehicle alignment specifications, means for sensing the status of the wheel alignment parameters, and means controlling the analog position of each of said indicators with respect to the limits associated therewith and in response to adjustments made to a wheel associated with the indicator, the last named means displaying digital values associated with the lower and upper limits and of the status of the parameter which is sensed.

2. In a wheel alignment system according to claim 1 in which said means for sensing said wheel alignment parameters includes a sensor assembly comprising a sensor support housing adapted to be carried by a wheel in a manner permitting the wheel to rotate independently of said housing, fixed and movable transparent panels disposed in closely spaced superimposed relation, means supporting said movable panel to rotate in opposite directions from a zero angle position for measuring angles to each side of said position, said panels being polarized at substantially 45° to each other when disposed at said zero angle relation to partially inhibit passage of light therethrough and serving to cause a reduction in transmissivity when rotated in one direction and an increase when rotated in an opposite direction, a first and second photosensor of a type providing an output signal which varies in response to the amount of light applied to it, said sensors being disposed on a common side of said panels and a light source disposed on the other, one of said photosensors being disposed to receive light transmitted directly to it from said light source uninhibited by said panels to establish a standard for comparison, the other photosensor being disposed to detect light transmitted from said light source via said panels, and means for comparing the output signals from both said sensors to provide a signal indicative of the angle displaced from the zero angle position of said movable panel.

3. Means for sensing wheel alignment parameters including a sensor assembly comprising a sensor support housing to be carried by a wheel in a manner permitting the wheel to rotate independently of said housing, fixed and movable transparent panels disposed in closely spaced superimposed relation, means supporting said movable panel to rotate in opposite directions from a zero angle position for measuring angles to each side of said position, said panels being polarized and substantially 45° to each other when disposed at said zero angle relation to partially inhibit passage of light therethrough and serving to cause a reduction in transmissivity when rotated in one direction and an increase when rotated in an opposite direction, a first and second photosensor of a type providing an output signal which varies in response to the amount of light applied to it, said sensors being disposed on a common side of said panels and a light source disposed on the other, one of said photosensors being disposed to receive light transmitted directly to it from said light source uninhibited by said panels to establish a standard for comparison, the other photosensor being disposed to detect light transmitted from said light source via said panels, and means for comparing the output signals from both said sensors to provide a signal indicative of the angle displaced from the zero angle position of said movable panel.

4. In a sensor assembly according to claim 3 further including a second light source disposed to transmit light directly to both said sensors to provide output signals from each, switch means serving to independently connect one or the other of said light sources to power to either detect angles to be sensed or to detect a difference between the output signals from both said sensors generated by a common light source to determine the accuracy of the relationship between the two sensors.

5. In a system for aligning the wheels of a vehicle comprising a sensor assembly for detecting angles of toe, camber, caster and providing output signals associated with each indicative of the value of each, gating means coupled to receive said output signals, analog to digital conversion means coupled to receive signals from said gating means, data storage means having a portion for receiving and storing the values of said angles, a microcomputer interposed between said storage means and said analog to digital conversion means and coupled to control said gating means for transmitting said output signals to said storage means, said data storage means having a second portion for storing the alignment specifications of substantially all automobiles and trucks, microprocessor means coupled to both said portions of said storage means, and a cartridge receiving controller including a keyboard coupled to said microprocessor for controlling said display to pictorially present said alignment parameters and the status of each.

6. In a wheel alignment system for aligning the wheels of a vehicle of a type having a chassis, a laterally spaced pair of steerable wheels and a laterally spaced pair of unsteerable wheels generally following the steerable wheels, said system including means for displaying on a screen a diagrammatic pictorial representation of a wheel in a plurality of pictorial diagrams, said diagrams respectively displaying pictorially the status of each of a corresponding plurality of alignment parameters for said wheel, said diagrams including spaced markers representative of the upper and lower limits of proper adjustment of a given alignment parameter for the wheel according to the manufacturer's specifications, an indicator disposed in association with each pictorial diagram to move between and beyond said markers on the screen to show diagrammatically the status of a wheel alignment parameter to be within or beyond proper limits, and means controlling the analog position of each of said indicators with respect to the limits associated therewith in response to the status of and adjustments made to the wheel parameter associated with the indicator.

7. In a wheel alignment system according to claim 6 further comprising means for displaying digital values adjacent to said markers and indicators and representative of said limits and said status.

8. In a wheel alignment system for aligning the wheels of a vehicle of a type having a chassis, a laterally spaced pair of steerable wheels and a laterally spaced pair of unsteerable wheels generally following the steerable wheels, said system including means for displaying on a screen a diagrammatic pictorial representation of a given wheel in a plurality of pictorial diagrams, said diagrams respectively displaying pictorially the status of each of a corresponding plurality of alignment parameters for said wheel, said diagrams including means representative of the upper and lower limits of proper adjustment of a given alignment parameter for the wheel according to the manufacturer's specifications, means disposed in association with each pictorial diagram for indicating the status of a wheel alignment parameter to be within or beyond proper limits, and means controlling the last named said means in response to the status of and adjustments made to the wheel parameter.

9. In a wheel alignment system according to claim 8 in which said means representative of the limits include means for displaying digital values adjacent to and representative of said limits.

10. In a wheel alignment system according to claim 8 in which said means for indicating the status of a wheel alignment parameter includes means for displaying digital values representative of said status.

11. In a wheel alignment system according to claim 8 in which said means representative of the limits comprises spaced markers, and wherein said means for indicating the status of a wheel alignment parameter includes an indicator movable between and beyond said markers to show diagrammatically the status of a wheel alignment parameter to be within or beyond proper limits.

12. In a wheel alignment system according to claim 11 wherein said means for indicating the status of a wheel alignment parameter further includes means for displaying the approximate digital value thereof adjacent to said movable indicator.

13. In a wheel alignment system according to claim 12 wherein said means representative of the limits includes means for displaying digital values representative of said limits.

14. In a system for aligning the wheels of a vehicle and for detecting and measuring ball joint wear, said system comprising a sensor assembly for detecting angles of alignment parameters including camber and toe and providing output signals associated with each indicative of first and second values of each of said parameters for a given wheel, said sensor assembly being adapted to be carried by a wheel of the vehicle, said first and second values of camber being provided respectively when the top of the wheel is urged toward the vehicle and when urged away from the vehicle, said first and second values of toe being provided with the steering wheel locked against rotation and when the leading part of the wheel is respectively urged toward the vehicle and urged away from the vehicle, means coupled to said sensor assembly for storing said first and second values of each said parameter, means for comparing said first and second values of each parameter for a wheel to measure the difference therebetween and provide first and second difference signals representative of the degree of ball joint wear in vertical and horizontal planes, the difference between said camber values, being representative of the vertical error in the ball joint and the difference between said toe values being representative of the horizontal error, means for displaying a diagrammatic pictorial representation of the vehicle chassis and a pictorial diagram shown in immediate association with a wheel thereof indicative of the vertical and horizontal error in its associated ball joints, and means coupling the last named means to receive said difference signals to provide said pictorial diagrams on said display means.

15. The method of measuring ball joint wear in a steerable wheel of a vehicle of a type having a steering wheel comprising the steps of restraining the steering wheel against rotation, measuring camber of said wheel while applying forces attempting to tilt the plane of the wheel toward the vehicle from the top of the wheel, measuring camber of said wheel while reversing said forces, storing the first and second named camber measurements, measuring toe of said wheel while applying forces attempting to steer the wheel to one side, measuring toe of said wheel applying reverse forces attempting to steer the wheel to the other side, storing the first and second named toe measurements, comparing the camber measurements to determine the ball joint wear in a vertical plane, comparing the toe measurements to provide information representative of ball joint wear in a horizontal plane, displaying a diagrammatic representation of a vehicle chassis including its wheels and a plurality of pictorial diagrams in immediate association with the steerable wheels of said chassis to pictorially show the status of ball joint wear for said steerable wheels.

16. In a system for aligning the wheels of a vehicle characterized by means for detecting and displaying the degree of ball joint wear for a given one of the wheels, said system comprising a sensor assembly adapted to be carried by a wheel of the vehicle to provide output signals representing the status of the alignment parameters of camber and toe for the wheel, means for comparing two successive output signals for the same rotational position of the wheel, said successive signals being with respect to and representative of the velue of one of said parameters to determine the difference between said successive signals, one of said signals being sensed while force is applied to said wheel tending to twist the plane of the wheel in one direction, the other of said signals being sensed while force is applied in an opposite direction, and means for pictorially displaying said difference in a manner representing the degree of ball joint wear associated with said one parameter.

17. In a system for aligning the wheels of a vehicle characterized by means for detecting ball joint wear, said system comprising sensor assemblies adapted to be carried by each of a plurality of steerable wheels of the vehicle to provide output signals representing the value of the alignment parameter of toe for each steerable wheel, means for continuously comparing said output signals during left and right steering movements of said steerable wheels to monitor the difference between said output signals representative of left and right toe, means for detecting change in said difference, means for converting said change to information representative of an angle, and means for supplying said information to a display of a type for displaying said angle.

18. In a wheel alignment system having means for sensing the status of wheel alignment parameters and for generating signals representative thereof, a video display coupled to the last-named means for providing a pictorial diagram thereon of a vehicle chassis indicating four wheels and pictorial representations of the status of wheel alignment parameters associated with each said wheel, means for displaying an enlarged portion of said diagram including the representation of one wheel and said alignment parameters associated therewith, part of the enlarged display including a diagrammatic representation of a four-wheel chassis with three of the four wheel positions having a common appearance different from the appearance of the fourth wheel position of said diagrammatic representation so as to identify the fourth wheel as being represented by the enlarged portion of the display.

\* \* \* \* \*